(12) United States Patent
Huynh et al.

(10) Patent No.: US 11,916,265 B2
(45) Date of Patent: Feb. 27, 2024

(54) METAL-DIELECTRIC CONDUIT ASSEMBLIES AND METHODS OF MAKING THEREOF

(71) Applicant: BLOOM ENERGY CORPORATION, San Jose, CA (US)

(72) Inventors: James Huynh, Fremont, CA (US); Michael Petrucha, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 595 days.

(21) Appl. No.: 17/165,298

(22) Filed: Feb. 2, 2021

(65) Prior Publication Data

US 2021/0242476 A1    Aug. 5, 2021

Related U.S. Application Data

(63) Continuation of application No. 62/970,333, filed on Feb. 5, 2020.

(51) Int. Cl.
  *H01M 8/2484* (2016.01)
  *H01M 8/0276* (2016.01)
  *H01M 8/00* (2016.01)
  *H01M 8/12* (2016.01)

(52) U.S. Cl.
  CPC ......... *H01M 8/0278* (2013.01); *H01M 8/004* (2013.01); *H01M 8/12* (2013.01); *H01M 2008/1293* (2013.01)

(58) Field of Classification Search
  CPC ............. H01M 8/2484; H01M 8/2485; H01M 8/12–1286; H01M 2008/1293; H01M 8/004
  See application file for complete search history.

(56) References Cited

U.S. PATENT DOCUMENTS

| | | | |
|---|---|---|---|
| 3,284,118 A | 11/1966 | Kessler, Jr. | |
| 3,746,374 A | 7/1973 | Sedgwick et al. | |
| 4,786,086 A | 11/1988 | Guthrie et al. | |
| 7,713,649 B2 | 5/2010 | Hickey et al. | |
| 8,404,398 B2 | 3/2013 | Perry et al. | |
| 8,921,001 B2 | 12/2014 | Huynh et al. | |

(Continued)

FOREIGN PATENT DOCUMENTS

| JP | 61-067565 A | 4/1986 |
|---|---|---|
| JP | 02-119059 A | 5/1990 |

(Continued)

OTHER PUBLICATIONS

Dictionary.com "snap ring" definition (https://www.dictionary.com/browse/snap-ring) (Year: 2023).*

(Continued)

*Primary Examiner* — Jeremiah R Smith
(74) *Attorney, Agent, or Firm* — THE MARBURY LAW GROUP PLLC

(57) ABSTRACT

A fuel cell system conduit assembly includes a dielectric tube having a first end and a second end, a metallic first flange press-fit to the first end of the dielectric tube, a metallic second flange press-fit to the second end of the dielectric tube, a first snap ring disposed between the first flange and the dielectric tube, and a second snap ring disposed between the second flange and the dielectric tube.

14 Claims, 6 Drawing Sheets

(56) References Cited

U.S. PATENT DOCUMENTS

| | | | |
|---|---|---|---|
| 8,968,958 B2 | 3/2015 | Gottmann et al. | |
| 10,050,298 B2 | 8/2018 | Huynh et al. | |
| 10,211,478 B2 | 2/2019 | Armstrong et al. | |
| 2004/0202914 A1 | 10/2004 | Sridhar et al. | |
| 2005/0162122 A1* | 7/2005 | Dunn | H01M 8/04208 320/101 |
| 2005/0164051 A1 | 7/2005 | Venkataraman et al. | |
| 2006/0204827 A1 | 9/2006 | Hickey et al. | |
| 2007/0196704 A1 | 8/2007 | Valensa et al. | |
| 2007/0269693 A1 | 11/2007 | Perry | |
| 2010/0040934 A1 | 2/2010 | Perry et al. | |
| 2010/0151346 A1 | 6/2010 | Eickhoff | |
| 2012/0040267 A1 | 2/2012 | Yoon et al. | |
| 2014/0147766 A1 | 5/2014 | Huynh et al. | |
| 2015/0357669 A1 | 12/2015 | Huynh et al. | |
| 2017/0104233 A1 | 4/2017 | Armstrong et al. | |
| 2020/0127308 A1* | 4/2020 | Petrucha | F16L 13/08 |

FOREIGN PATENT DOCUMENTS

| | | | |
|---|---|---|---|
| JP | 11-351467 A | 12/1999 | |
| JP | 2003-109646 | 4/2003 | |

OTHER PUBLICATIONS

Merriam-Webster.com "snap ring" definition (https://www.merriam-webster.com/dictionary/snap%20ring) (Year: 2023).*

McDonald, H., "Chattanooga Fuel Cell Demonstration Project," U.S. Department of Energy Hydrogen Program, 2005, www.hydrogen.energy.gov/pdfs/progress05/viii_3_mcdonald.pdf, pp. 1209-1214.

Ferguson et al., "Chattanooga Fuel Cell Demonstration Project," U.S. Department of Energy Hydrogen Program, Annual Merit Review Meeting, May 23-26, 2005, http://www.hydrogen.energy.gov/pdfs/review05/tvp_2_ferguson.pdf, 20pgs.

International Search Report and Written opinion received in connection with international application No. PCT/US2013/071823; dated Mar. 14, 2014.

International Search Report and Written Opinion received in connection with international application No. PCT/US2015/033645; dated Jul. 16, 2015.

International Preliminary Report on Patentability and Written Opinion of the International Searching Authority for International Application No. PCT/US2015/033645, dated Dec. 15, 2016, 11 pages.

* cited by examiner

METAL-DIELECTRIC CONDUIT ASSEMBLIES AND METHODS OF MAKING THEREOF

FIELD

Various embodiments relate to hermetic high temperature, metal-dielectric fuel conduit assemblies, and in particular, metal-dielectric fuel conduit assemblies for a fuel cell column.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate conduits between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

The various embodiments of the present disclosure provide a conduit assembly, comprising: a dielectric tube having a first end and a second end; a metallic first flange press-fit to the first end of the dielectric tube; a metallic second flange press-fit to the second end of the dielectric tube; a first snap ring disposed between the first flange and the dielectric tube; and a second snap ring disposed between the second flange and the dielectric tube.

Various embodiments provide a method of making a fuel cell system conduit assembly, comprising: press-fitting a metallic first and second flanges onto respective first and second ends of a dielectric tube; and fluidly connecting the first and second flanges to respective first and second bellows.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide hermetic dielectric conduit assemblies which may be incorporated into a fuel cell system, such as into the fuel conduits of fuel cell stacks externally manifolded for air and internally manifolded for fuel. The embodiment dielectric conduit assemblies may withstand the high temperatures and thermal cycling that occurs in the hot area of the fuel cell system or inside a fuel cell system's insulated hot box (e.g., with temperatures up to 1000° C., 1250° C., or higher) without leaking or otherwise failing. For example, in some embodiments, the dielectric conduit assembly may be part of a hermetically sealed gas delivery line in a fuel cell system and may include components that compensate for changes in stress due to thermal expansion.

Various embodiment conduit assemblies may compensate for differences in coefficients of thermal expansion of various components and the uneven expansion and associated stress that may result at high temperatures in the fuel cell system. Further, embodiment conduit assemblies may withstand the cycling of expansion and contraction resulting from heating and cooling of the fuel cell system, such as cycling between temperatures from 24° C. to 1000° C.

In various embodiments, the embodiment dielectric conduit assemblies may also act to electrically isolate portions of the fuel conduits or the fuel cell stack. For example, the dielectric conduit assembly may allow the use of metallic fuel manifold plates in the stack by electrically isolating the fuel cell stack or column from the balance of the fuel delivery plumbing. The metallic manifold plates beneficially provide continuous electrical conductivity within a stack or column, thereby reducing the possibility for degradation of resistance connections, as will be described below.

Figure 1:
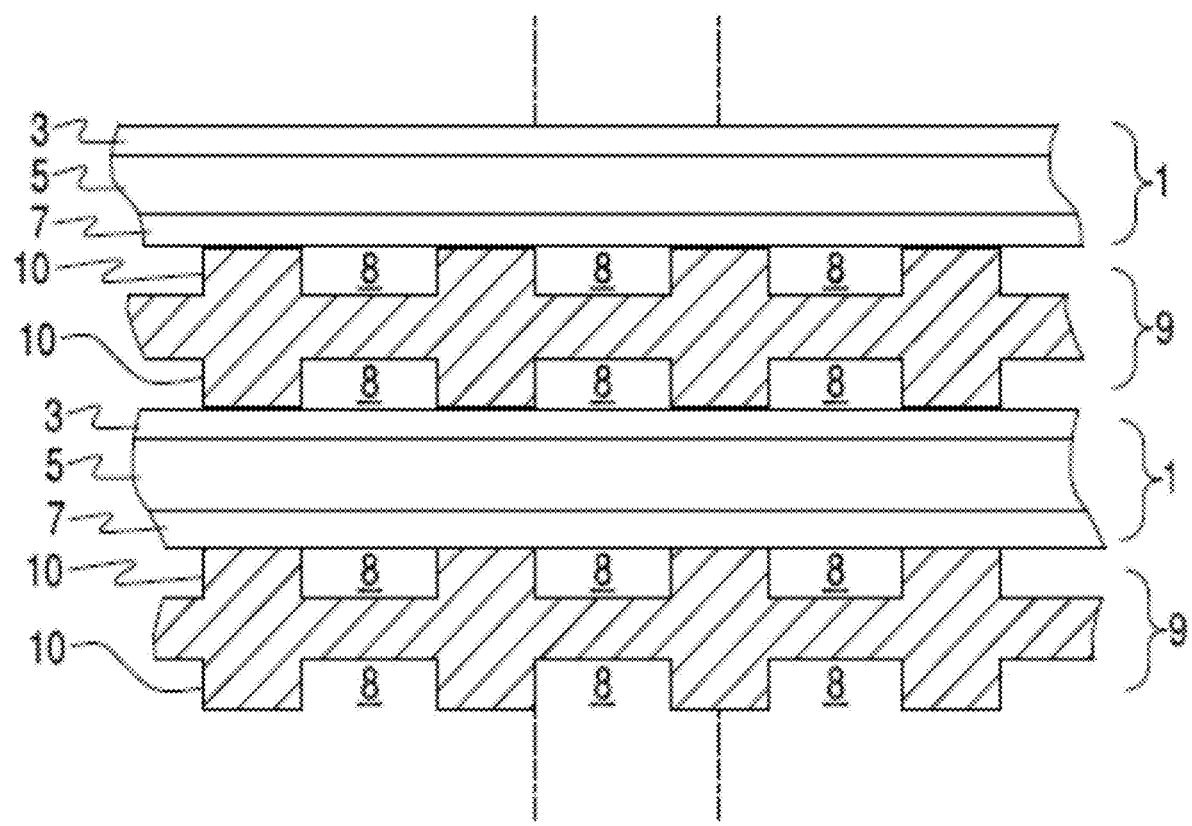
FIG. 1 illustrates a side cross-sectional view of a SOFC stack.

FIG. 1 illustrates a solid oxide fuel cell (SOFC) stack in which each SOFC 1 comprises a cathode electrode 3 (e.g., LSM or other conductive perovskites), a solid oxide electrolyte 5 (e.g., YSZ, ScSZ, or doped ceria), and an anode electrode 7 (e.g., a cermet such as a nickel-stabilized zirconia and/or doped ceria cermet).

Various materials may be used for the cathode electrode 3, electrolyte 5, and anode electrode 7. For example, the anode electrode may comprise a cermet comprising a nickel containing phase and a ceramic phase. The nickel containing phase may consist entirely of nickel in a reduced state. This phase may form nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys.

The ceramic phase may comprise a stabilized zirconia, such as yttria and/or scandia stabilized zirconia and/or a doped ceria, such as gadolinia, yttria and/or samaria doped ceria. The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode may comprise an electrically conductive material, such as an electrically conductive perovskite material, such as lanthanum strontium manganite (LSM). Other conductive perovskites, such as LSCo, etc., or metals, such as Pt, may also be used. The cathode electrode may also contain a ceramic phase similar to the anode electrode. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1 is vertically oriented, fuel cell stacks may be oriented horizontally or in any other direction. Fuel and air may be provided to the electrochemically active surface, which can be large.

The gas flow separator 9 (referred to as a gas flow separator plate when part of a planar stack), containing gas flow passages or channels 8 between ribs 10, separates the individual cells in the stack. The gas flow separator plate 9 separates fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 7 of one cell to the cathode or air electrode 3 of the adjacent cell. In this case, the gas flow separator plate 9, which functions as an interconnect, is made of or contains electrically conductive material. FIG. 1 shows that the lower SOFC 1 is located between two interconnects 9.

Interconnects may be made of or may contain electrically conductive material, such as a metal alloy (e.g., chromium-iron alloy) or an electrically conductive ceramic material, which optionally has a similar coefficient of thermal expansion to that of the solid oxide electrolyte in the cells (e.g., a difference of 0-10%). An electrically conductive contact layer, such as a nickel contact layer, may be provided between the anode electrode and the interconnect. Another optional electrically conductive contact layer may be provided between the cathode electrode and the interconnect. The plurality of fuel cells in a fuel cell stack may share a common fuel inlet and exhaust passages or risers.

A fuel cell stack may include a distinct electrical entity which contains two end plates on opposite ends of the stack which are connected to power conditioning equipment and the power (i.e., electricity) output of the stack. Thus, in some configurations, the electrical power output from such a distinct electrical entity may be controlled separately from other stacks. In other embodiments, multiple stacks may share the same end plates. In this case, the stacks may jointly comprise a distinct electrical entity (e.g., a column of stacks).

A fuel cell stack may be part of a larger fuel cell system for generating power. The fuel cell stack may be located in a hot zone within such a system. During normal operation, this hot zone may operate at a high temperature, such as a temperature of about 600° C. or more, e.g., 600-1000° C., such as 750-950° C.

Figure 2:
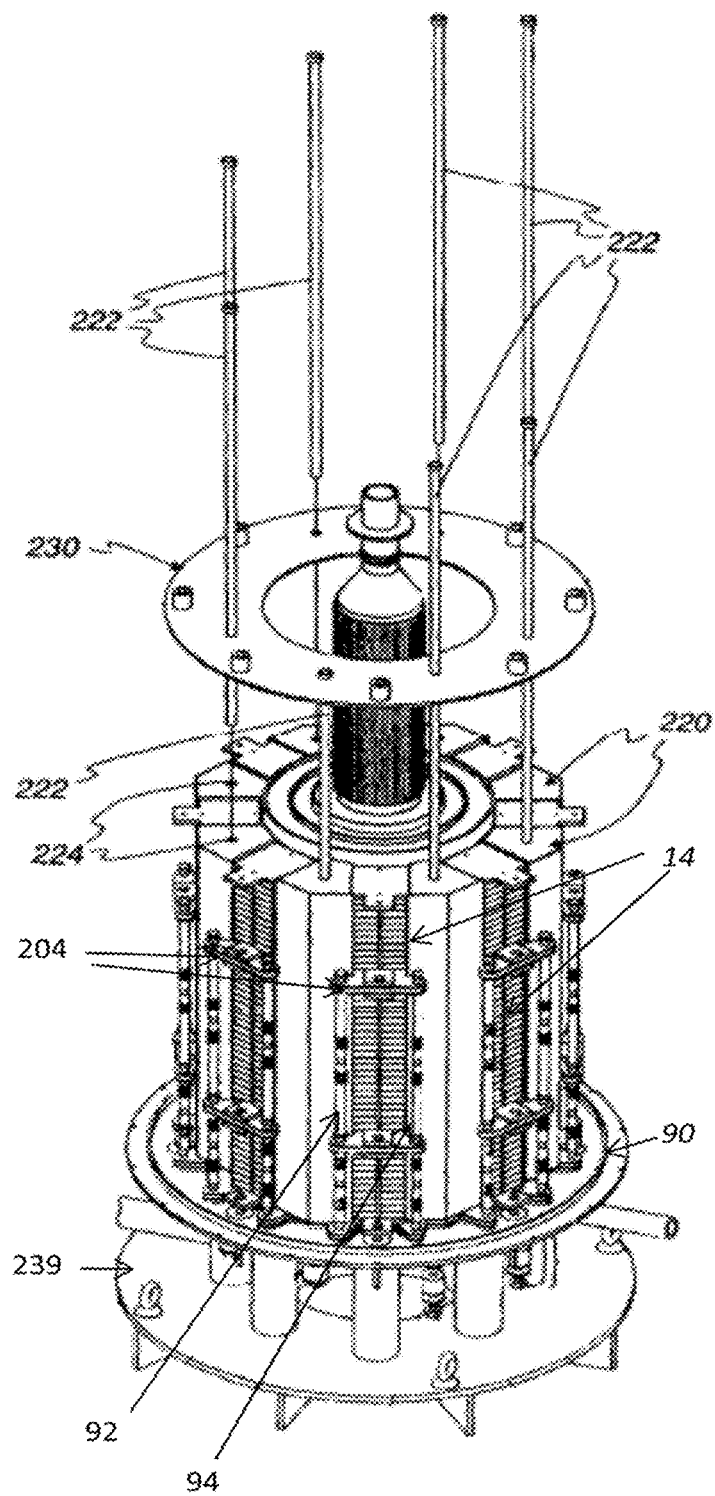
FIG. 2 illustrates a three dimensional cut-away view of a prior art fuel cell assembly.

FIG. 2 illustrates an example of a prior art fuel cell system, such as described in U.S. Pat. No. 8,968,958 and incorporated by reference in its entirety, in which the solid oxide fuel cell (SOFC) stacks 14 are located on a base. Each stack 14 may comprise a collection of fuel cells 1 and interconnects 9. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the externally manifolded cathode feed (e.g., air) into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 2 also shows fuel distribution manifolds 204 between the stacks in the stack column and fuel inlet and exhaust conduits 92, 94 connected to the manifolds. The fuel distribution manifolds 204 comprise a box made of metal plates and fuel delivery space inside the box.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222.

In an alternative embodiment, the load is transmitted through the base 239 as this is the only zero datum of the system. Penetrations or feed-throughs through the base 239 are used in order to pull the required load from the base 239.

Figure 3:
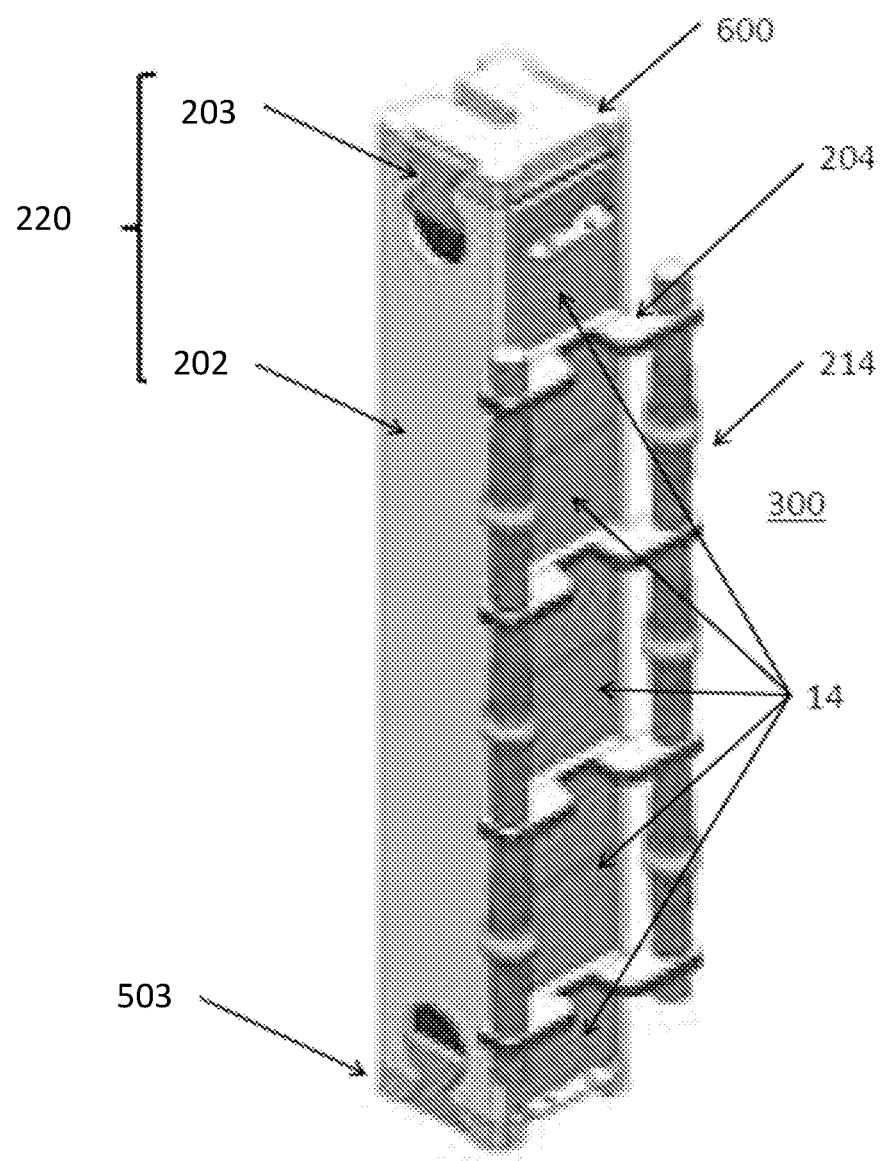
FIG. 3 is a perspective view of a fuel cell stack assembly of a fuel cell system, according to various embodiments of the present disclosure

FIG. 3 is a perspective view of a fuel cell stack assembly 300 of a fuel cell system, according to various embodiments of the present disclosure. Referring to FIG. 3, the assembly 300 includes fuel conduits 214 (e.g. column fuel inlet and outlet pipes) connected to fuel manifolds 204 located between fuel cell stacks 14 that are arranged in a column.

The fuel cell stack assembly 300 includes side baffles 220 disposed on opposing sides of the column of fuel cell stacks 14. Each of the side baffles 220 includes a baffle plate 202. In addition, the side baffles 220 include ceramic inserts 203 to connect the baffle plates 202 to a compression assembly 600 and a lower block 503. However, in some embodiments each side baffle 220 may include multiple baffle plates 202 connected by ceramic inserts 203.

Figure 4A:
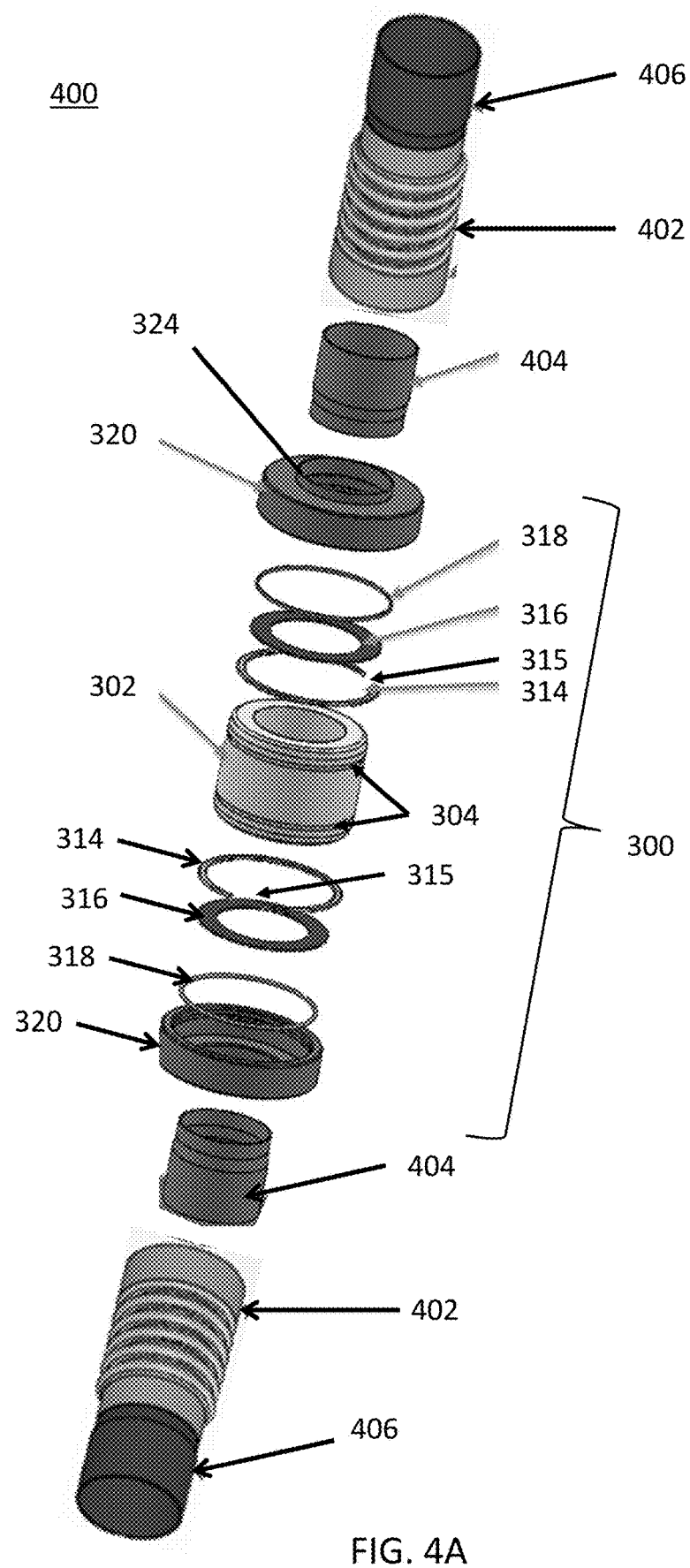
FIG. 4A illustrates an exploded perspective view of a fuel conduit assembly, according to an embodiment of the present disclosure.
Figure 4B:
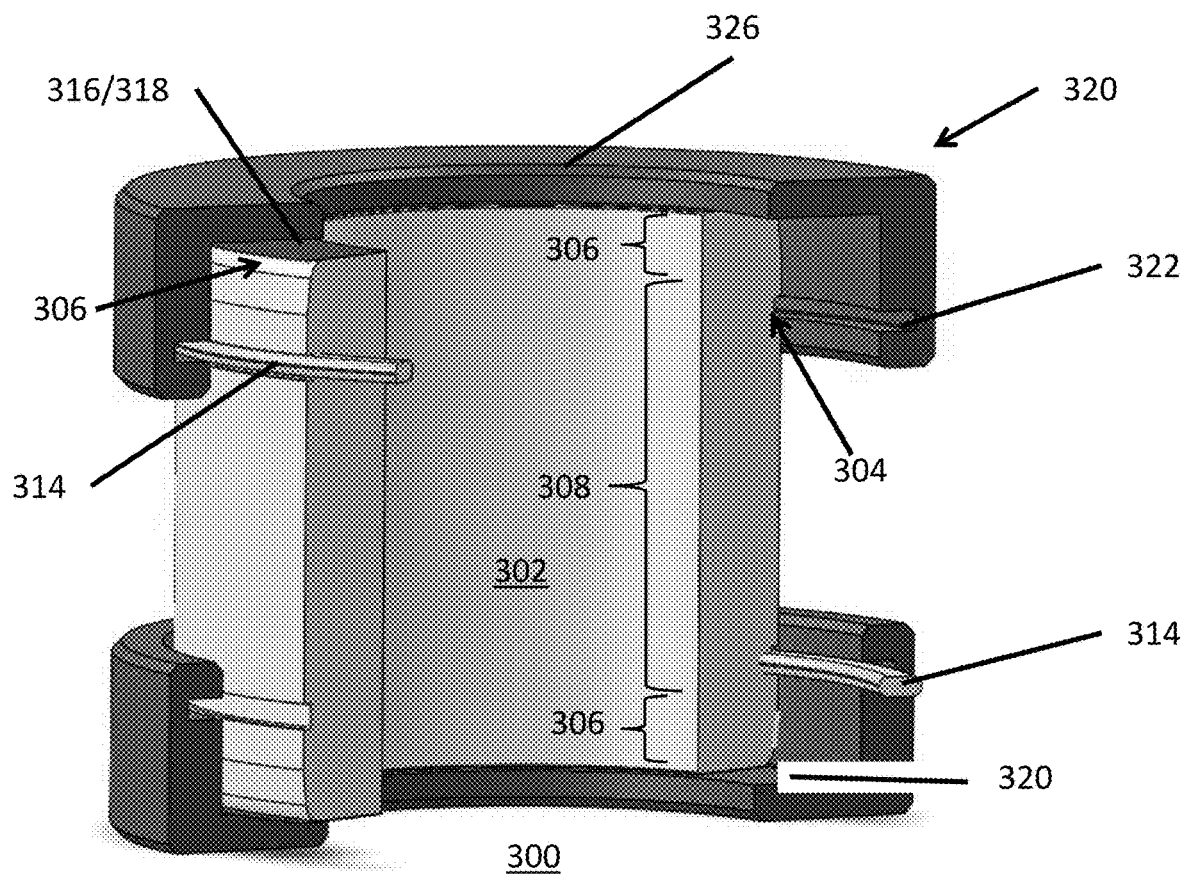
FIG. 4B is a partial perspective view of an assembled dielectric assembly of FIG. 4A.

FIG. 4A illustrates an exploded view of an exemplary fuel conduit assembly 400, which may be included in the fuel conduits 214 shown in FIG. 3. FIG. 4B is a partial perspective view of a dielectric assembly 300 of the fuel conduit assembly 400 of FIG. 4A.

Referring to FIGS. 4A and 4B, the fuel conduit assembly 400 may include metal tubes 406 that may be fluidly connected to opposing ends of the dielectric assembly 300. For example, the fuel conduit assembly 400 may include respective bellows 402 and transition tubes 404 configured to connect the metal tubes 406 to respective ends of the dielectric assembly 300. In some embodiments, the transition tubes 404 may be omitted and the bellows 402 may be directly connected to the dielectric assembly 300.

The metal tubes 406, bellows 402, and/or transition tubes 404 may be formed of may be made of metal alloys that can withstand the operating temperatures of the fuel cell system and have minimal reactivity with gas flowing through the gas delivery device. For example, suitable metal alloys include stainless steels such as SS 446 (e.g., by weight 23-30% Cr, <1.5% Mn, <0.75% Si, <0.5% Ni, 0.1-0.25% N, <0.12% C, <0.04% P, <0.03% S, balance Fe), 321 stainless (e.g., <0.08% C, 17-19% Cr, 9-12% Ni, <2% Mn, <1% Si, 0.3-0.7% Ti, <0.045% P, <0.03% S, balance Fe), or A286 steels (e.g., 24-27% Ni, 13-16% Cr, 1.9-2.35% Ti, <2% Mn, 1-1.5% Mo, <1% Co, 0.1-0.5% V, <0.35% Al, 0.003-0.01% B, <1% Si, <0.08% C, <0.025% P, <0.025% S, balance Fe), or high temperature alloys, such as Ni—Cr, Ni—Cr—W, Ni—Cr—Mo, Fe—Ni, Ni—Co, Fe—Co, or Fe—Ni—Co alloys. For example, exemplary alloys include Inconel® 600 series alloys, such as 600 (14-17% Cr, 6-10% Fe, 1-1.7% Al, <1% Mn, <0.5% Cu, <0.5% Si, <0.1% C, <0.015 S, balance Ni), 601 (21-25% Cr, 58-63% Ni, <1% Mn, <1% Cu, <0.5% Si, <0.15% C, <0.015 S, balance Fe), 625 (20-23% Cr, <5% Fe, 8-10% Mo, 3.15-4.15 Nb, <0.015 P, <0.4% Al, <0.5% Mn, <0.4% Ti, <0.5% Si, <0.1% C, <0.015 S, balance Ni), or 625 LCF (20-23% Cr, <5% Fe, 8-10% Mo, 3.15-4.15 Nb, <0.015 P, <0.4% Al, <0.5% Mn, <0.4% Ti, <0.15% Si, <0.03% C, <0.015 S, <1% Co, <0.02% N, balance Ni) alloys; or Haynes® 200, 500, or 600 series alloys, such as 230 (e.g., by weight, 22% Cr, 14% W, 0.5% Mn, 2% Mo, <5% Co, 0.1% C, 0.3% Al, <0.015% B, 0.4% Si, 0.02% La, <3% Fe, balance Ni), 556 (e.g., by weight, 22% Cr, 2.5% W, 1% Mn, 3% Mo, 18% Co, 0.1% C, 0.2% Al, 0.6% Ta, 0.4% Si, 0.02% La, 0.02% Zr, 0.2% N, 20% Ni, balance Fe), or 617 (e.g., by weight, 22% Cr, 0.3% Ti, 9% Mo, 12.5% Co, 0.07% C, 1.2% Al, 1% Fe, balance Ni) alloys.

In various embodiments, the metal tubes 406 may be coupled with other fuel cell system parts, such as by using metallic joints formed by brazing, welding, or mechanical seals. For example, the metal tubes 406 may be coupled to a fuel cell column (such as coupled to fuel inlets of one or more fuel manifolds 204 as shown in FIG. 3), and/or a fuel cell hot box (such as the fuel inlet conduit of the fuel cell system). As used herein, fluidly connected means connected such that a fluid, such as a fuel inlet or outlet stream (e.g., a gas stream) can flow directly or indirectly between the fuel cell conduit assembly 400 and the fuel manifolds 204.

The metal tubes 406 may be attached to bellows 402 by brazing, welding, or mechanical seals. The bellows 402 may be similarly connected to the transition tubes 404. The bellows 402 may act to compensate for differences in coefficients of thermal expansion between fuel cell components. For example, the bellows 402 may act to minimize stresses exerted upon the fuel cell stack or column components, such as fuel manifolds 204.

In various embodiments, the bellows 402 may minimize stresses exerted upon the fuel cell stack or column by deforming in the axial and/or radial directions in preference to other components of the metal tubes 406 and other fuel cell components. In this way, the bellows 402 may absorb stress rather than transmit stress to other components, such as ceramic components which can crack and break under excessive stress. In various embodiments, the metal tubes 406 and the bellows 402 may be matched to have the same or similar CTE. For example, the metal tubes 406 and the bellows 402 may comprise the same material or different materials that are closely matched coefficient of thermal expansion.

In alternate embodiments, the metal tubes 406 may include or be made entirely of bellows themselves rather than coupled with bellows 402, such that the bellows 402 may be directly coupled with the transition tubes 404 or the flanges 320.

The dielectric assembly 300 may include a dielectric tube 302, flanges 320, and connection elements, such as snap rings 314, washers 316, and seals 318. The dielectric tube 302 may be configured to electrically isolate the metal tubes 406 from each other, and thus to prevent current from flowing through the fuel conduits 214 between adjacent fuel manifolds 204 in the fuel cell column. For example, the dielectric tube 302 may be made from a ceramic material with dielectric properties such that it is electrically insulating under SOFC stack 14 operating conditions (e.g., 700-1000° C.). For example, the dielectric tube 302 may comprise alumina or other ceramic materials possessing high dielectric strength at operating temperatures of the fuel cell system.

In various embodiments, the dielectric tube 302 may comprise high purity alumina, such as greater than 90% alumina (e.g., 94%-99.8% alumina or 97%-99.8% alumina) In alternate embodiments, the dielectric tube 302 may comprise silicon nitride, silicon oxynitride, or silicon aluminum oxynitride (SiAlON) based ceramics or zirconia toughened alumina ("ZTA"). The dielectric tube 302 may be fluidly connected with the metal tubes 406 at both ends. The dielectric tube 302 may have beveled ends 306 and a central portion 308 disposed between the beveled ends 306. Grooves 304 (e.g., channels) may be formed in opposing sides of the outer surface of the central portion 308. The grooves 304 may be configured to respectively receive the snap rings 314.

The snap rings 314 may comprise full or partial rings. In other words, the snap rings 314 may have a shape of a complete hollow cylinder or a section of a hollow cylinder. The hollow cylinder has a greater diameter than height. For example, as shown in FIG. 4A, the snap rings 314 comprise partial rings having a "C" shape. Thus, each snap ring 314 may have a break 315 in its circumference.

The flanges 320 and/or snap rings 314 may be formed a high temperature-stable metal alloy as described above with respect to the metal tubes 406, bellows 402, and/or transition tubes 404. In some embodiments, the flanges 320, metal tubes 406, bellows 402, and/or transition tubes 404 may be formed of the same alloy, or may be formed of different alloys having closely matched coefficients of thermal expansion (CTE's), such as CTE's that are within +/−5%, +/−3%, +/−1%, +/−0.5%, of one another or less.

The washers 316 and seals 318 may be formed of glass materials having a glass transition temperature sufficiently high to withstand fuel cell system operating temperatures (e.g., 600-1200° C.). For example, the glass materials may include borosilicate glass materials, barium and calcium aluminosilicate ($BaO—CaO—Al_2O_3—SiO_2$) glass ceramic materials, or the like. In some embodiments, the washers 316 and/or seals 318 may be formed by applying a seal material ink to the opposing ends of the dielectric tube 302.

The flanges 320 may be configured to respectively mate with the opposing ends 306 (e.g. first and second ends) of the dielectric tube 302. In particular, the flanges 320 may be press-fit onto the dielectric tube 302. The beveled ends 306 may be configured to facilitate the press-fitting of the flanges 320. For example, inner surfaces of the flanges 320 may be angled to correspond to an angle of the outer surfaces of the respective beveled ends 306, such that contact therebetween biases the flanges radially outward with respect to a rotational axis of the dielectric tube 302 and increases frictional contact therebetween.

The flanges 320 may include grooves 322 formed on an inner surface thereof. The grooves 322 may be configured to respectively receive the snap rings 314 when the flanges 320 are attached to the dielectric tube 302. In particular, the grooves 304 and 322 are configured such that the snap rings 314 respectively maintain a compressive force between each of the flanges 320 and the dielectric tube 302. Thus, the respective grooves 304 and 322 are located at the same level (e.g., in the same vertical level plane) once the components of the dielectric assembly 300 are assembled together.

One washer 316 and seal 318 may disposed between each end 306 of the dielectric tube 302 and the respective flanges 320. In particular, the compressive force between the flanges 320 and the dielectric tube 302 may operate to compress the washers 316 and seals 318 against the opposing ends 306 of the dielectric tube 302, such that fluid tight seals are formed between the flanges 320 and the dielectric tube 302.

The flanges 320 and the dielectric tube 302 may have different CTE's. Accordingly, during operation, the flanges 320 may expand more than the dielectric tube 302, such that a small gap may be formed between at least a portion of the outer surface of the dielectric tube 302 and the inner surfaces of the flanges 320. However, the snap ring 314 may be sized to compensate for the CTE differences and maintain the compressive force between the inner diameter of each of the flanges 320 and the outer diameter of the dielectric tube 302, and thereby maintain the fluid tight sealing. The distance from the groove 304 to the nearest end 306 of the dielectric tube 302 may be relatively small compared to the height of the dielectric tube 302 such that the snap ring 314 is under a high load at all times.

In one embodiment, there is no brazing or welding inside the dielectric assembly 300. In other words, the dielectric tube 302 is not directly brazed or welded to any other component of the dielectric assembly 300 or the fuel conduit assembly 400.

The transition tubes 404 may be attached to the flanges 320 by welding, brazing, or mechanical seals, or the like. The transition tubes 404 may be attached to the flanges 320 before or after assembly of the dielectric assembly 300. As shown in FIG. 4A, the flanges 320 may include support rings 324 into which the transition tubes 404 are respectively inserted. The support rings 324 may facilitate welding and/or brazing of the flanges 320 and the transition tubes 404.

In other embodiments and as shown in FIG. 4B, the flanges 320 may include bevels 326 into which the support rings 324 or the transition tubes 404 are respectively inserted. The bevels 326 may also facilitate welding and/or brazing of the flanges 320 and the support rings 324 or the transition tubes 404. In other words, in one embodiment, the support rings 324 may be brazed or welded to the flanges 320, and the transition tubes 404 may be brazed or welded to the support rings 324. In another embodiment, the support rings 324 may be omitted and the transition tubes 404 may be brazed or welded directly to the flanges 320. In yet another embodiment, the flange 320 and the support ring 324 may comprise a unitary metal body which is formed during a single metal forming step.

Figure 5:
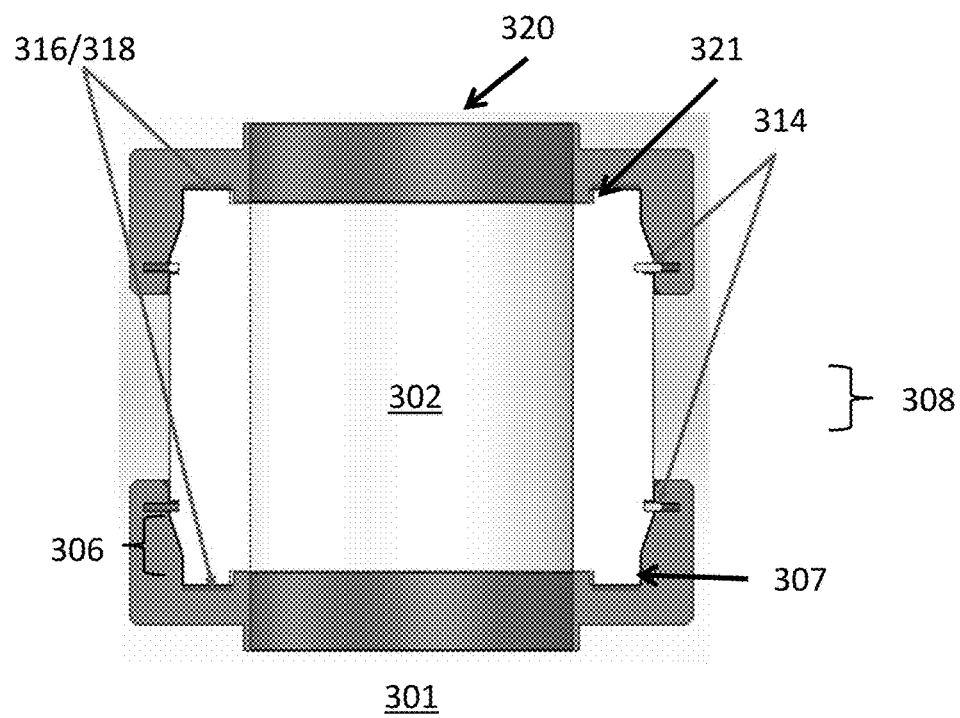
FIG. 5 is a sectional view of a dielectric assembly, according to an alternative embodiment of the present disclosure.

FIG. 5 illustrates a modified dielectric assembly 301, according to an alternative embodiment of the present disclosure. The dielectric assembly 301 is similar to the dielectric assembly 300, so only the differences therebetween will be discussed in detail. Referring to FIG. 5, the dielectric tube 302 may include rims (e.g., vertically protruding fins) 307 that respectively project from the beveled ends 306. Each of the flanges 320 may include an annular groove 321 configured to receive the respective rim 307.

Accordingly, various embodiments provide dielectric assemblies configured to create fluid-tight connections between metal and ceramic components via press-fitting without any metal-to-ceramic welding or brazing. In contrast, conventional dielectric assemblies rely upon metal-to-ceramic welding or brazing to provide fluid-tight connections between metal and ceramic components. As such, conventional dielectric assemblies are more complicated to manufacture and install. In addition, the metal-to-ceramic brazed joints of conventional dielectric assemblies are more prone to failure, due to thermal expansion differences between the metal and ceramic components, as compared to the presently provided dielectric assemblies.

Figure 6:
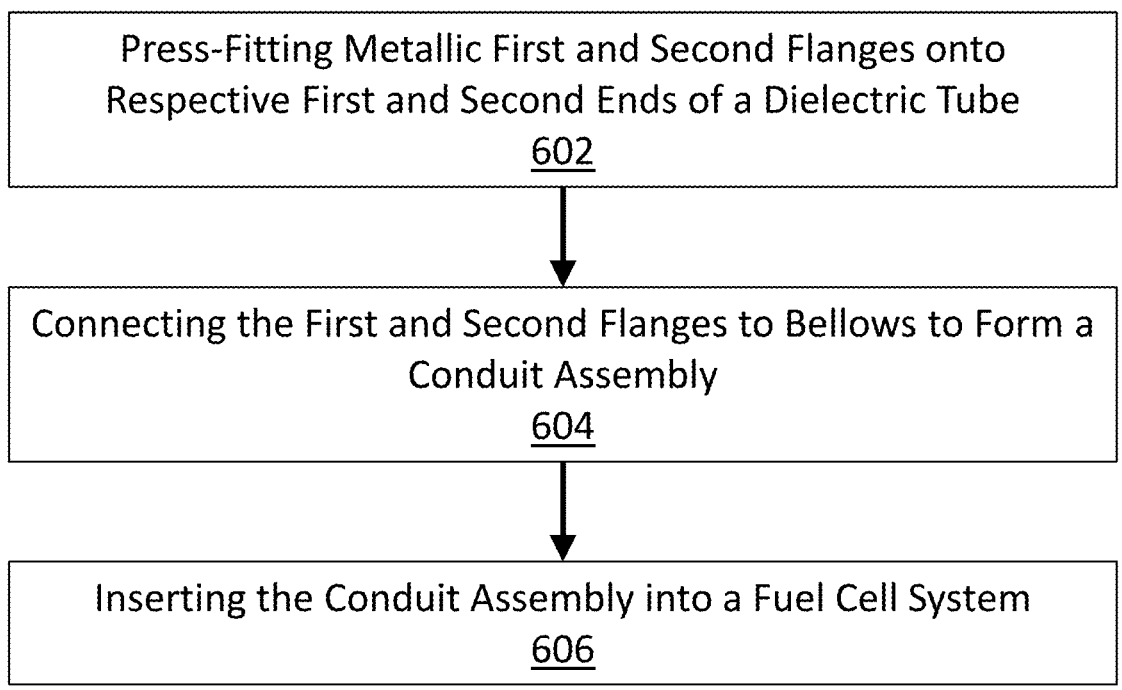
FIG. 6 is a flow chart illustrating a method according to various embodiments of the present disclosure.

FIG. 6 is a flow diagram illustrating an exemplary method of making a fuel cell system conduit assembly as described above with respect to FIGS. 4A and 4B, according to various embodiments of the present disclosure. Referring to FIG. 6, in step 602, the method may include press-fitting metallic first and second flanges respectively onto first and second ends of a dielectric tube.

In various embodiments, step 602 may also include inserting first and second snap rings into grooves formed in the outside surface of the dielectric tube, and disposing a washer and a seal on each of the first and second ends of the dielectric tube, prior to the press-fitting. The press-fitting may also include pressing the first and second flanges onto the dielectric tube until the first and second snap rings are seated in first and second grooves respectively formed in the first and second flanges. Accordingly, the snap rings may be configured to maintain a compressive force on the washers and seals disposed between the flanges and the ends of the dielectric ring.

In step 604, the first and second flanges may be connected to bellows to form a conduit assembly. For example, the first and second flanges may be welded, brazed, or mechanically connected to transition tubes that extend from the first and second flanges. The transition tubes may be welded or brazed to the flanges before or after the press-fitting. In other embodiments, the bellows may be connected directly to the first and second flanges.

In step 606, the method may additionally include inserting the conduit assembly into the fuel cell system. Inserting the conduit assembly into the fuel cell system may involve attaching the conduit assembly to a fuel manifold of a fuel cell column.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system conduit assembly, comprising:
a dielectric tube having a first end and a second end;
a metallic first flange press-fit to the first end of the dielectric tube;
a metallic second flange press-fit to the second end of the dielectric tube;
a first snap ring disposed between the first flange and the dielectric tube; and
a second snap ring disposed between the second flange and the dielectric tube.

2. The conduit assembly of claim 1, further comprising:
a first washer and a first seal disposed between the first flange and the first end of the dielectric tube and formed of a glass or a glass-ceramic material; and
a second washer and a second seal disposed between the second flange and the second end of the dielectric tube and formed of a glass or a glass-ceramic material.

3. The conduit assembly of claim 1, wherein:
the first snap ring is disposed in a groove formed in the dielectric tube and a groove the first flange; and
the second snap ring is disposed in a groove formed in the dielectric tube and a groove formed in the second flange.

4. The conduit assembly of claim 3, wherein:
the first snap ring is configured to maintain a compressive force between the first flange and the first end of the dielectric tube; and
the second snap ring is configured to maintain a compressive force between the second flange and the second end of the dielectric tube.

5. The conduit assembly of claim 1, further comprising first and second transition tubes respectively fluidly connected to the first and second flanges.

6. The conduit assembly of claim 5, wherein the first and second flanges comprise support rings that respectively extend away from the dielectric tube and receive the first and second transition tubes, respectively.

7. The conduit assembly of claim 5, further comprising first and second bellows respectively connected to the first and second transition tubes.

8. The conduit assembly of claim 1, wherein the first snap ring is a partial ring and the second snap ring is a partial ring.

9. The conduit assembly of claim 1, wherein the conduit assembly is incorporated into a fuel conduit which is fluidly connected to a fuel cell column.

10. The conduit assembly of claim 1, wherein the first and second flanges comprise stainless steel or a nickel chromium alloy.

11. The conduit assembly of claim 1, wherein the dielectric tube comprises a ceramic material.

12. The conduit assembly of claim 11, wherein the ceramic material comprises, alumina, zirconia toughened alumina, or silicon nitride.

13. The conduit assembly of claim 11, wherein the dielectric tube is not directly welded or brazed to any other component of the conduit assembly.

14. A fuel cell system, comprising:
a fuel cell column comprising a fuel manifold; and
a conduit assembly of claim 1 fluidly connected to the fuel manifold.

* * * * *